Patented Dec. 4, 1951

2,577,698

UNITED STATES PATENT OFFICE 2,577,698

MELAMINE SALT OF PENICILLIN

Lee Cannon Cheney, Fayetteville, N. Y., assignor to Bristol Laboratories Inc., Syracuse, N. Y., a corporation of New York No Drawing. Application April 6, 1951, Serial No. 219,760

2 Claims. (Cl. 260—239.1)

This present invention relates to a new amine salt of penicillin. More particularly, this invention relates to melamine salts of penicillin which are capable of exerting a repository antibiotic action and useful for oral administration and for external application. These melamine salts of penicillin are especially suitable for adding to animal feeds such as poultry feeds because of their relative insolubility and great stability.

The new penicillin salts of the present invention have the following formula:

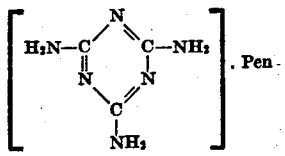

wherein Pen designates an acid penicillin radical or an active moiety thereof, capable of forming an addition salt with melamine.

A more comprehensive understanding of this invention is obtained by reference to the following examples:

Example I

Twenty-five grams of melamine (0.198 mole) were placed in a flask and 6NHCl added slowly with boiling until all amine dissolved; about 400 ml. of HCl were necessary. After cooling and scratching the white melamine hydrochloride crystallized out. It was filtered off, washed twice in ice water, sucked dry and dried in vacuo over phosphorous pentoxide overnight.

Weight: 30.5 g.
Yield: 90%

Three grams of sodium penicillin G were dissolved in a minimum of water at room temperature. An equivalent amount (1.44 g.) of melamine hydrochloride was dissolved in about 40 cc. of water at room temperature. The melamine solution was filtered due to cloudiness. The aqueous penicillin was added to the aqueous amine solution and a precipitate appeared at once. Five grams of sodium chloride were added; the mixture cooled in an ice bath, the penicillin salt filtered off, washed twice with small amounts of water and dried in vacuo over phosphorous pentoxide.

Assay of saturated water solution:
  Iodometric _____u./cc.___ 11,722
  Bio-assay _____u./cc.___ 12,870
Assay of 20 mg./20 ml. solution:
  Iodometric _____u./ml.(mg.)__ 1,051
  Bio-assay _____u./ml.(mg.)__ 1,024

Example II

Four hundred milligrams of sodium penicillin G were dissolved in 5 ml. of distilled water and a suspension of 320 mg. of melamine hydrochloride in 5 ml. of distilled water was added. The mixture was stirred for 15 minutes and then set in an ice bath overnight. The precipitate that formed was filtered off, pressed well and sucked dry.

Assay:
  Theoretical _____u./mg.___ 1,285
  Found _____u./mg.___ 1,080

While the present invention has been described with particular reference to the melamine salt of penicillin G it will be understood that melamine salts of other penicillins are also included within the scope of this invention. For instance, the natural penicillins such as penicillin F, X, dihydro F, and K and mixtures of two or more such penicillins, particularly such mixtures containing at least 85% of penicillin G, are included within the scope of this invention.

I claim:
1. A salt of penicillin and melamine.
2. A salt of penicillin G and melamine.

LEE CANNON CHENEY.

No references cited.